(12) United States Patent
Dai

(10) Patent No.: US 9,942,712 B2
(45) Date of Patent: Apr. 10, 2018

(54) INFORMATION PROCESSING METHOD, TERMINAL, SERVER AND COMPUTER STORAGE MEDIUM

(71) Applicant: Tencent Technology (Shenzhen) Company Limited, Shenzhen (CN)

(72) Inventor: Wenhan Dai, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/627,134

(22) Filed: Jun. 19, 2017

(65) Prior Publication Data
US 2017/0318425 A1 Nov. 2, 2017

Related U.S. Application Data

(63) Continuation of application No. PCT/CN2016/073087, filed on Feb. 1, 2016.

(30) Foreign Application Priority Data

May 4, 2015 (CN) .......................... 2015 1 0221153

(51) Int. Cl.
*G01C 21/36* (2006.01)
*H04L 29/08* (2006.01)
(Continued)

(52) U.S. Cl.
CPC ........ *H04W 4/023* (2013.01); *G01C 21/3679* (2013.01); *H04L 67/18* (2013.01); *H04L 67/26* (2013.01); *H04W 88/02* (2013.01)

(58) Field of Classification Search
CPC .. H04W 4/023; H04W 88/02; G01C 21/3679; H04L 67/18; H04L 67/26
See application file for complete search history.

(56) References Cited

U.S. PATENT DOCUMENTS

2010/0082241 A1* 4/2010 Trivedi .............. G01C 21/3679
701/532
2011/0159884 A1* 6/2011 Chawla .............. H04W 52/0254
455/456.1
(Continued)

FOREIGN PATENT DOCUMENTS

CN 102155952 A 8/2011
CN 104811474 A 7/2015

OTHER PUBLICATIONS

Tencent Technology, ISR, PCT/CN2016/073087, dated Apr. 21, 2016, 2 pgs.

*Primary Examiner* — Qun Shen
(74) *Attorney, Agent, or Firm* — Morgan, Lewis & Bockius LLP

(57) ABSTRACT

An information processing method performed at a terminal includes: starting a location service of a first application; obtaining place-of-departure information and destination information in a display based on an operation of a user, and generating route indication information according to the place-of-departure information and the destination information; detecting, based on the location service of the first application, real-time information of the user when the user moves along a route indicated by the route indication information, and reporting the real-time information to a server, to obtain push information that is obtained through comprehensive determining based on at least one combination of location information, time information, user behavior information, historically collected information, and point-of-interest (POI) information; and receiving the push information that is directionally pushed when a preset condition is satisfied, and displaying, in the first application, the push information and/or location information combined with the push information.

9 Claims, 8 Drawing Sheets

(51) Int. Cl.
*H04W 4/02* (2018.01)
*H04W 88/02* (2009.01)

(56) References Cited

U.S. PATENT DOCUMENTS

2012/0108265 A1* 5/2012 Morin ................ H04W 4/02
    455/456.2
2013/0029692 A1* 1/2013 Liang ................ G06Q 30/02
    455/456.3

* cited by examiner

INFORMATION PROCESSING METHOD, TERMINAL, SERVER AND COMPUTER STORAGE MEDIUM

PRIORITY CLAIM AND RELATED APPLICATION

This application is a continuation application of PCT Patent Application No. PCT/CN2016/073087, entitled "INFORMATION PROCESSING METHOD, TERMINAL, SERVER, AND COMPUTER STORAGE MEDIUM" filed on Feb. 1, 2016, which claims priority to Chinese Patent Application No. 201510221153.3, entitled "INFORMATION PROCESSING METHOD, TERMINAL, SERVER, AND COMPUTER STORAGE MEDIUM" filed on May 4, 2015, both of which are incorporated by reference in their entirety.

FIELD OF THE TECHNOLOGY

The present disclosure relates to communications technologies, and in particular, to an information processing method, a terminal, a server, and a computer storage medium.

BACKGROUND OF THE DISCLOSURE

The Internet and communications technologies enrich people's life. People generally use various applications having a navigation function in daily traveling. For example, an application scenario is navigation by using a map application, where a user obtains an indication of a route from a place of departure to a destination, and after reaching the destination according to the route indication, ends the use of the application.

With increasing requirements of users, the users expect that functions of a map application should not be limited to only route indication, and other functions may further be developed in the map application besides the route indication. For example, it is expected that information sharing and information pushing functions can be implemented to meet requirements brought by the information explosion in the Internet era. However, related technologies have not provided an effective solution with respect to such a need.

SUMMARY

In view of this, embodiments of the present invention intend to provide an information processing method, a terminal, a server, and a computer storage medium.

The technical solutions in the embodiments of the present invention are implemented as follows:

An embodiment of the present invention provides an information processing method, the method being applied to a terminal, and the terminal having a display, and the method including:

starting a location service of a first application, and running the first application on the terminal;

obtaining place-of-departure information and destination information in the display based on an operation of a user, and generating route indication information according to the place-of-departure information and the destination information;

detecting, based on the location service of the first application, real-time information of the user when the user moves along a route indicated by the route indication information, and reporting the real-time information to a server, to obtain push information that is obtained through comprehensive determining based on at least one combination of location information, time information, user behavior information, historically collected information, and point-of-interest (POI) information; and receiving the push information that is directionally pushed when a preset condition is satisfied, and displaying, in the first application, the push information and/or location information combined with the push information.

An embodiment of the present invention provides a terminal, the terminal has a display, and the terminal including:

a running unit, configured to: start a location service of a first application, and run the first application on the terminal;

a user-operation response unit, configured to: obtain place-of-departure information and destination information in the display based on an operation of a user, and generate route indication information according to the place-of-departure information and the destination information;

a reporting unit, configured to: detect, based on the location service of the first application, real-time information of the user when the user moves along a route indicated by the route indication information, and report the real-time information to a server, to obtain push information that is obtained through comprehensive determining based on at least one combination of location information, time information, user behavior information, historically collected information, and POI information; and a receiving and display unit, configured to: receive the push information that is directionally pushed when a preset condition is satisfied, and display, in the first application, the push information and/or location information combined with the push information.

When performing processing, the running unit, the reporting unit, and the receiving and display unit may be implemented by using a central processing unit (CPU), a digital signal processor (DSP), or a field-programmable gate array (FPGA).

An embodiment of the present invention provides an information processing method, the method being applied to a server, and the method including:

obtaining real-time information of a user when the user moves along a route indicated by route indication information, where the real-time information is detected based on a location service of a first application;

performing comprehensive determining based on at least one combination of location information, time information, user behavior information, historically collected information, and POI information to obtain push information; and directionally pushing the push information to a terminal when a preset condition is satisfied.

An embodiment of the present invention provides a server, including:

an obtaining unit, configured to obtain real-time information of a user when the user moves along a route indicated by route indication information, where the real-time information is detected based on a location service of a first application;

a processing unit, configured to perform comprehensive determining based on at least one combination of location information, time information, user behavior information, historically collected information, and POI information to obtain push information; and a pushing unit, configured to directionally push the push information to a terminal when a preset condition is satisfied.

When performing processing, the obtaining unit, the processing unit, and the pushing unit may be implemented by using a CPU, a DSP, or an FPGA.

An embodiment of the present invention further provides a computer storage medium, storing computer executable instructions, the computer executable instructions being used to implement the foregoing information processing methods.

The embodiments of the present invention provide an information processing method, applied to a terminal. The terminal has a display. The method includes: starting a location service of a first application, and running the first application on the terminal; obtaining place-of-departure information and destination information in the display based on an operation of a user, and generating route indication information according to the place-of-departure information and the destination information; detecting, based on the location service of the first application, real-time information of the user when the user moves along a route indicated by the route indication information, and reporting the real-time information to a server, to obtain push information that is obtained through comprehensive determining based on at least one combination of location information, time information, user behavior information, historically collected information, and POI information; and receiving the push information that is directionally pushed when a preset condition is satisfied, and displaying, in the first application, the push information and/or location information combined with the push information.

By using the embodiments of the present invention, in addition to positioning a location of a user and navigation, push information obtained through comprehensive determining based on at least one combination of location information, time information, user behavior information, historically collected information, and POI information can be obtained based on real-time information of the user when the user moves along a route indicated by route indication information. In this way, information sharing and information pushing functions are implemented.

DESCRIPTION OF EMBODIMENTS

The implementation of the technical solutions is further described in detail with reference to the accompanying drawings.

Figure 1:
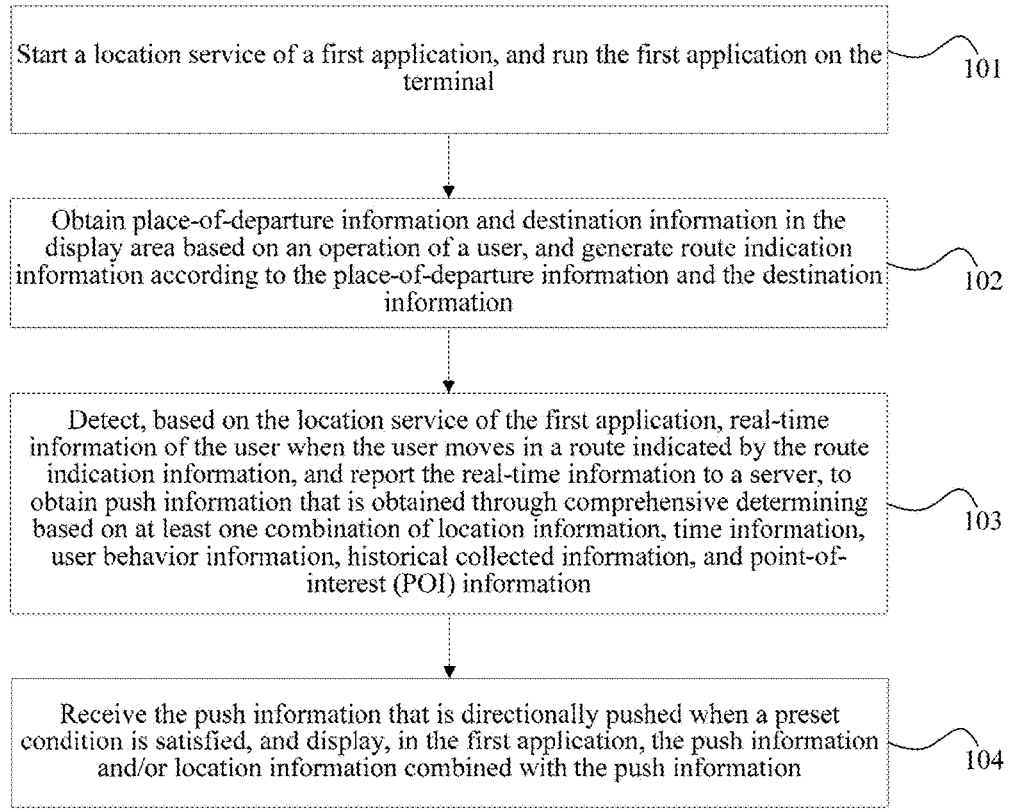
FIG. 1 is a schematic diagram of an implementation process of a method embodiment of the present invention.

An embodiment of the present invention provides an information processing method, where the method is applied to a terminal, and the terminal has a display. As shown in FIG. 1, the method includes:

Step 101: Start a location service of a first application, and run the first application on the terminal.

Herein, the location service in this step is not limited to a GPS or location based service (LBS) function in a mobile phone. The first application may be a navigation application, such as a map application.

Step 102: Obtain place-of-departure information and destination information in the display based on an operation of a user, and generate route indication information according to the place-of-departure information and the destination information.

Step 103: Detect, based on the location service of the first application, real-time information of the user when the user moves along a route indicated by the route indication information, and report the real-time information to a server, to obtain push information that is obtained through comprehensive determining based on at least one combination of location information, time information, user behavior information, historically collected information, and POI information.

Herein, the real-time information in this step includes at least real-time location information, but is not limited to the location information, and may include real-time time information and the like.

Step 104: Receive the push information that is directionally pushed when a preset condition is satisfied, and display, in the first application, the push information and/or location information combined with the push information.

Herein, in this step, a mechanism of triggering pushing of the push information is not limited to triggering pushing of the push information in a process of using a route service, but may include triggering pushing of the push information within a short time window after the route service is used. The triggering pushing of the push information in a process of using a route service may be triggering a mechanism of pushing the push information when it is detected that a distance between a location indicated by current real-time location information and a location indicated by the destination information falls within a preset threshold range, for example, the distance to the destination is 1 kilometer to 3 kilometers.

Herein, in this step, not only the push information, for example, discount information or business hours information of a Sichuan cuisine restaurant "Meizhou Dongpo", may be displayed in the display of the first application, but also location information that is displayed in combination with the route indication information for navigation, for example, there is a Sichuan cuisine restaurant "Meizhou Dongpo" at a distance of 500 meters, may be displayed.

By using this embodiment of the present invention, in step 101, a first application for navigation is started, and a location service function is started, so that real-time location information of a user may be positioned and monitored. In step 102, the user enters place-of-departure information and destination information in place-of-departure and destination prompt boxes in a display interface of the first application, for example, the place-of-departure information is "Shangdi" and the destination information is "Xidan", and in response to the place-of-departure information and the destination information entered by the user, the place-of-departure information and the destination information are obtained based on the operation of the user, route indication information is generated according to the place-of-departure information and the destination information, a navigation route obtained based on the route indication information is presented in the display of the first application on the terminal, and real-time information, which is not limited to real-time location information, of the user in the navigation route is obtained in a timely manner for intuitive presentation in the navigation route, so that the user may learn a current location of the user in the navigation route in a timely manner. In step 103, the real-time information is reported to a server, and after obtaining all to-be-screened information based on the real-time information, the server performs comprehensive determining based on a preset policy of the server, for example, based on at least one combination of location information, time information, user behavior information, historically collected information, and POI information, to obtain, in all the to-be-screened information, final push information to be pushed to the user and presented on the terminal, so that the user can be provided with not only real-time positioning and navigation functions of the first application for navigation, but also other push information related to the real-time information of the user, for example, information such as location information of a store around the destination, office hours information of a government office around the destination, and discount information of a store around the destination.

In an implementation manner of this embodiment of the present invention, the preset condition is used to indicate timing for triggering pushing of the push information; and correspondingly, the operation of receiving the push information that is directionally pushed when a preset condition is satisfied includes: detecting the preset condition that is set in the first application, and reporting the preset condition to the server; and when the preset condition triggers pushing of the push information in a process of using the route indication information, receiving, in the process of using the route indication information, the push information that is directionally pushed by the server according to the reported preset condition.

In an implementation manner of this embodiment of the present invention, the preset condition is used to indicate timing for triggering pushing of the push information; and correspondingly, the operation of receiving the push information that is directionally pushed when a preset condition is satisfied includes: detecting the preset condition that is set in the first application, and reporting the preset condition to the server; and when the preset condition triggers pushing of the push information within a short time window indicated by a first threshold after the route indication information is used, receiving, after the route indication information is used, the push information that is directionally pushed by the server according to the reported preset condition.

In an implementation manner of this embodiment of the present invention, the method further includes: determining that the preset condition is satisfied when detecting that a distance between a location indicated by location information included in the real-time information of the user when the user moves along the route indicated by the route indication information and a location indicated by the destination information falls within a preset threshold range, and reporting the preset condition to the server to trigger the server to directionally push the push information.

Figure 2:
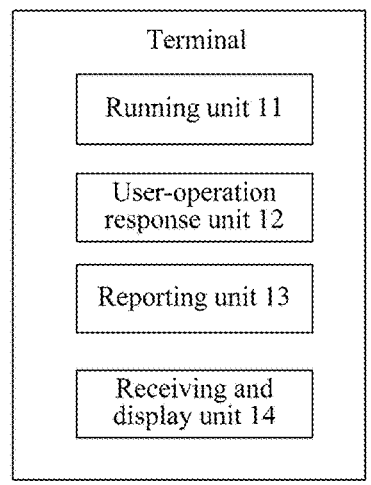
FIG. 2 is a schematic structural diagram of a terminal embodiment of the present invention.

An embodiment of the present invention provides a terminal, where the terminal has a display. As shown in FIG. 2, the terminal includes:

a running unit 11, configured to: start a location service of a first application, and run the first application on the terminal;

a user-operation response unit 12, configured to: obtain place-of-departure information and destination information in the display based on an operation of a user, and generate route indication information according to the place-of-departure information and the destination information;

a reporting unit 13, configured to: detect, based on the location service of the first application, real-time information of the user when the user moves along a route indicated by the route indication information, and report the real-time information to a server, to obtain push information that is obtained through comprehensive determining based on at least one combination of location information, time information, user behavior information, historically collected information, and POI information; and a receiving and display unit 14, configured to: receive the push information that is directionally pushed when a preset condition is satisfied, and display, in the first application, the push information and/or location information combined with the push information.

In an implementation manner of this embodiment of the present invention, the preset condition is used to indicate timing for triggering pushing of the push information. Correspondingly, the reporting unit 13 is further configured to: detect the preset condition that is set in the first application, and report the preset condition to the server. The receiving and display unit 14 is further configured to: when the preset condition triggers pushing of the push information in a process of using the route indication information, receive, in the process of using the route indication information, the push information that is directionally pushed by the server according to the reported preset condition.

In an implementation manner of this embodiment of the present invention, the preset condition is used to indicate timing for triggering pushing of the push information. Correspondingly, the reporting unit 13 is further configured to: detect the preset condition that is set in the first application, and report the preset condition to the server. The receiving and display unit 14 is further configured to: when the preset condition triggers pushing of the push information within a short time window indicated by a first threshold after the route indication information is used, receive, after the route indication information is used, the push information that is directionally pushed by the server according to the reported preset condition.

In an implementation manner of this embodiment of the present invention, in a scenario in which the preset condition triggers pushing of the push information in a process of using the route indication information, the reporting unit 13 further includes a detection subunit and a reporting subunit, where the detection subunit is configured to: detect whether a distance between a location indicated by location information included in the real-time information of the user when the user moves along the route indicated by the route indication information and a location indicated by the destination information falls within a preset threshold range, and determine that the preset condition is satisfied when detecting that the distance falls within the preset threshold range, trigger the reporting subunit to perform reporting. The reporting subunit is configured to report the preset condition to the server to trigger the server to directionally push the push information.

Figure 3:
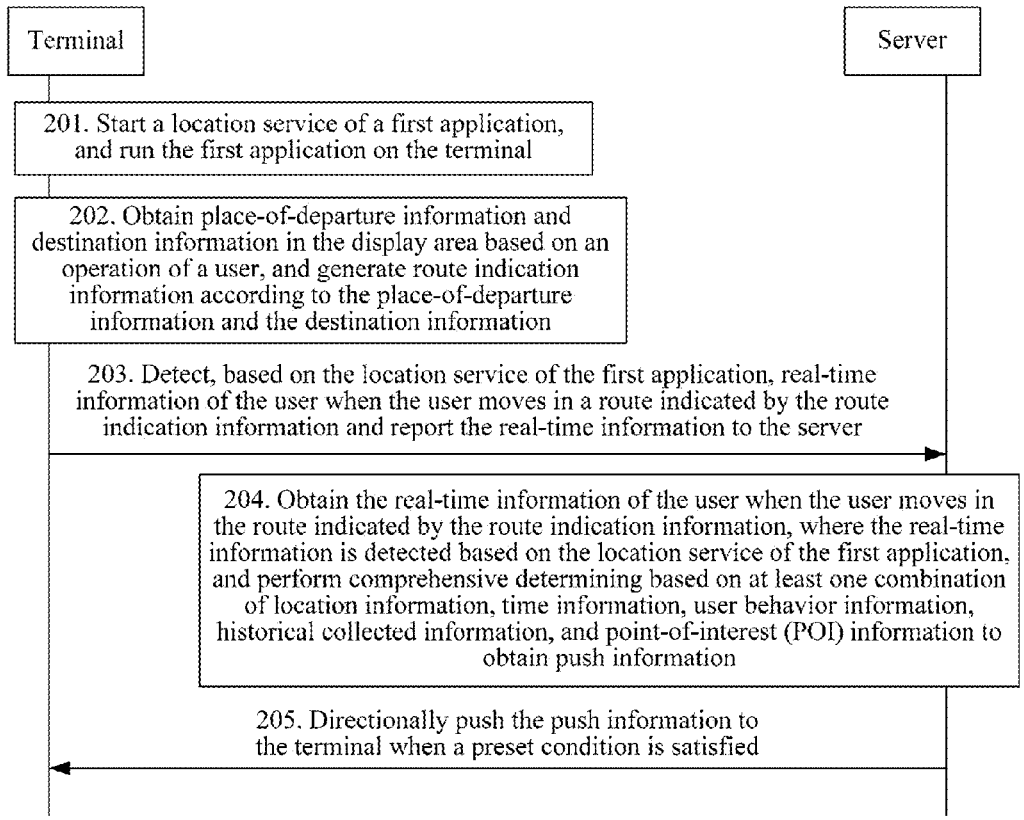
FIG. 3 is a schematic diagram of another implementation process of a method embodiment of the present invention.

An embodiment of the present invention provides an information processing method, which describes complete interaction between a terminal and a server. As shown in FIG. 3, the method includes:

S201: Start a location service of a first application, and run the first application on the terminal.

Herein, the location service in this step is not limited to a GPS or LBS function in a mobile phone. The first application may be a navigation application, such as a map application.

Step 202: Obtain place-of-departure information and destination information in the display based on an operation of a user, and generate route indication information according to the place-of-departure information and the destination information.

Step 203: Detect, based on the location service of the first application, real-time information of the user when the user moves along a route indicated by the route indication information and report the real-time information to the server.

Step 204: Obtain the real-time information of the user when the user moves along the route indicated by the route indication information, where the real-time information is detected based on the location service of the first application, and perform comprehensive determining based on at least one combination of location information, time information, user behavior information, historically collected information, and POI information to obtain push information.

Step 205: Directionally push the push information to the terminal when a preset condition is satisfied.

Herein, in this step, the preset condition is used to indicate timing for triggering pushing of the push information. The preset condition includes either one of the following forms:

Form 1: Trigger pushing of the push information in a process of using the route indication information.

In Form 1, the triggering pushing of the push information in a process of using the route indication information further includes: the preset condition is satisfied when it is detected that a distance between a location indicated by location information included in the real-time information of the user when the user moves along the route indicated by the route indication information and a location indicated by the destination information falls within a preset threshold range.

Form 2: Trigger pushing of the push information within a short time window indicated by a first threshold after the route indication information is used.

Figure 4:
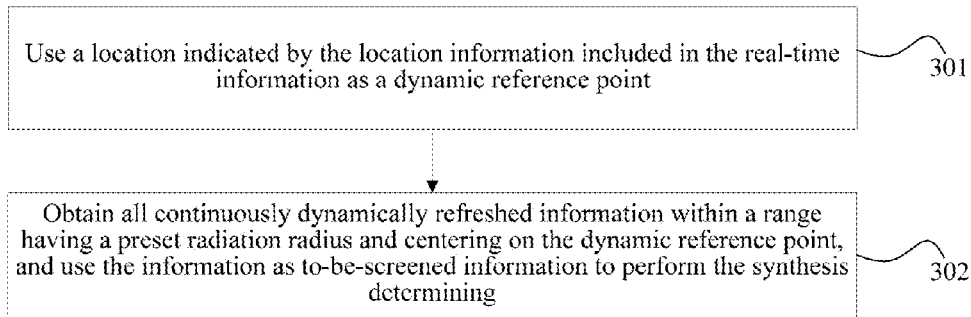
FIG. 4 is a schematic diagram of still another implementation process of a method embodiment of the present invention.

Based on the foregoing method embodiment, as shown in FIG. 4, the performing comprehensive determining based on at least one combination of location information, time information, user behavior information, historically collected information, and POI information to obtain push information includes:

Step 301: Use a location indicated by the location information included in the real-time information as a dynamic reference point.

Step 302: Obtain all continuously dynamically refreshed information within a range having a preset radiation radius and centering on the dynamic reference point, and use the information as to-be-screened information to perform the synthesis determining.

In an implementation manner of this embodiment of the present invention, the performing the synthesis determining to obtain push information includes: obtaining, according to a current distance between the dynamic reference point and the location indicated by the destination information, and speed information included in the obtained real-time information, information about a predicted time that needs to be spent in reaching the destination; and screening the to-be-screened information according to the time information, to obtain, in the to-be-screened information, surrounding-life-service information matching the time information, and determining the surrounding-life-service information as the push information. For example, if the time information indicates that it is 12 a.m., it is supposed that the user may need to have lunch, and a restaurant is selected from the to-be-screened information for pushing. If the time information indicates that it is 2 p.m., it is supposed that the user may need to have afternoon tea, and information about a coffee shop offering afternoon tea is pushed.

In an implementation manner of this embodiment of the present invention, the performing the synthesis determining to obtain push information includes: obtaining a function attribute identifier corresponding to the destination information; and screening the to-be-screened information according to the function attribute identifier, to obtain, in the to-be-screened information, surrounding-life-service information matching the function attribute identifier, and determining the surrounding-life-service information as the push information. For example, if the function attribute identifier of the destination indicates a store, discount coupon information or product promotion information or like information is selected from the to-be-screened information for pushing to facilitate shopping of the user. If the function attribute identifier of the destination indicates a governmental service organization, office hours information is selected from the to-be-screened information for pushing to facilitate affair handling of the user in the governmental service organization. If the function attribute identifier of the destination indicates a park, descriptions of typical scenic spots of the park or like information are selected from the to-be-screened information for pushing to facilitate visit of the user in the park.

In an implementation manner of this embodiment of the present invention, the performing the synthesis determining to obtain push information includes: obtaining information about surroundings around the location indicated by the destination information; and when the user behavior information indicates that the user is in a travel-by-driving mode, screening the to-be-screened information according to reference information including the travel-by-driving mode, the destination information, and the surrounding information, to obtain, in the to-be-screened information, surrounding-life-service information matching the reference information, and determining the surrounding-life-service information as the push information. If the user is in the travel-by-driving mode, intends to go to a well-known hospital, for example, "Peking Union Medical College Hospital", and is familiar with the surroundings, based on the determining factors, information about a parking lot or a parking status around "Peking Union Medical College Hospital" may be selected from the to-be-screened information, to facilitate parking of the user.

In an implementation manner of this embodiment of the present invention, the performing the synthesis determining to obtain push information includes any one of the following manners:

Manner 1 includes:

obtaining historically collected information and/or POI information of the user; and screening the to-be-screened information according to the historically collected information and/or the POI information of the user, to obtain, in the to-be-screened information, surrounding-life-service information matching the historically collected information and/or the POI information of the user, and determining the surrounding-life-service information as the push information.

For example, if the user has collected a Sichuan cuisine restaurant, a Sichuan cuisine restaurant is preferentially pushed when a restaurant is pushed to the user.

Manner 2 includes:

obtaining historically collected information and/or POI information of the user; and screening the to-be-screened information according to the historically collected information and/or the POI information of the user, to obtain, in the to-be-screened information, surrounding-life-service information that does not match the historically collected information and/or the POI information of the user, marking the surrounding-life-service information as information not to be pushed, and deleting the information that is marked as information not to be pushed from the to-be-screened information.

For example, the user is fond of singing in a KTV in an entertainment place, street shopping, traveling, and other activities. Surrounding-life-service information matching these historical collections and/or POIs is collected as a subset A, and the to-be-screened information is used as a universal set X, and a set in the universal set X excluding the subset A is denoted as a subset B. Information in the subset B is marked as information not to be pushed, so that the information in the subset B is no longer pushed to the user. Alternatively, the subset B may be directly deleted from the universal set X to save storage space. Moreover, a smaller set brings a faster query speed.

Manner 3 includes:

obtaining historically collected information and/or POI information of the user; and screening the to-be-screened information according to the historically collected information and/or the POI information of the user, to obtain, in the to-be-screened information, surrounding-life-service information that matches the historically collected information and/or the POI information of the user and that is frequently used, marking the surrounding-life-service information as information having a low pushing priority, and postponing pushing of the information that is marked as information having a low pushing priority, or directly deleting the information that is marked as information having a low pushing priority from the to-be-screened information.

For example, the user favors a spicy flavor, and has eaten in a Sichuan cuisine restaurant "Meizhou Dongpo" or "Feiteng Yuxiang". When a restaurant is pushed to the user, the Sichuan cuisine "Meizhou Dongpo" or "Feiteng Yuxiang" in which the user has eaten is marked as a restaurant having a low pushing priority, and another Sichuan cuisine restaurant "Lapopo" that the user has not patronized or a hot-pot restaurant "Haidilao" offering spicy food is preferentially pushed. That is, information that the user frequently uses, or that is about a place that the user has patronized, or that the user is familiar with is not preferentially pushed, and information that matches the historically collected information and/or the POI information of the user but that the user does not frequently use, or that is about a place that the user has not patronized, or that the user is not familiar with is preferentially pushed.

In an implementation manner of this embodiment of the present invention, because the information that the user frequently uses, or that is about a place that the user has patronized, or that the user is familiar with is information that is clear to the user, and is known by the user without being pushed. To save storage space and improve a query speed, the information that the user frequently uses, or that is about a place that the user has patronized, or that the user is familiar with may be marked. Similar to Manner 2, the information may be marked as information not to be pushed, to form a subset C in the universal set X. The information in the subset C is marked as information not to be pushed, so that the information in the subset C is no longer pushed to the user. Alternatively, the subset C may be directly deleted from the universal set X to save storage space. Moreover, a smaller set brings a faster query speed.

Figure 5:
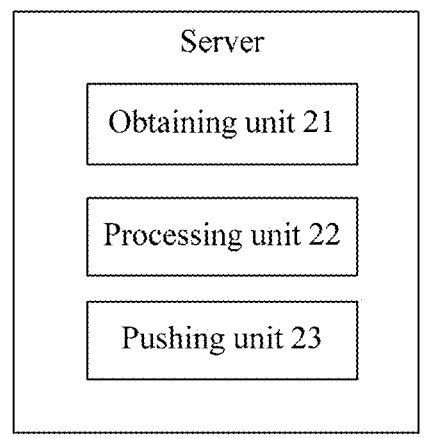
FIG. 5 is a schematic structural diagram of a server embodiment of the present invention.

An embodiment of the present invention provides a server. As shown in FIG. 5, the server includes:

an obtaining unit 21, configured to obtain real-time information of a user when the user moves along a route indicated by route indication information, where the real-time information is detected based on a location service of a first application;

a processing unit 22, configured to perform comprehensive determining based on at least one combination of location information, time information, user behavior information, historically collected information, and POI information to obtain push information; and a pushing unit 23, configured to directionally push the push information to a terminal when a preset condition is satisfied.

In an implementation manner of this embodiment of the present invention, the preset condition is used to indicate timing for triggering pushing of the push information. The preset condition includes either one of the following forms:

Form 1: Trigger pushing of the push information in a process of using the route indication information.

The form of triggering pushing of the push information in a process of using the route indication information further includes: the preset condition is satisfied when it is detected that a distance between a location indicated by location information included in the real-time information of the user when the user moves along the route indicated by the route indication information and a location indicated by the destination information falls within a preset threshold range.

Form 2: Trigger pushing of the push information within a short time window indicated by a first threshold after the route indication information is used.

In an implementation manner of this embodiment of the present invention, the processing unit is further configured to: use a location indicated by the location information included in the real-time information as a dynamic reference point; and obtain all continuously dynamically refreshed information within a range having a preset radiation radius and centering on the dynamic reference point, and use the information as to-be-screened information to perform the synthesis determining.

In an implementation manner of this embodiment of the present invention, the processing unit is further configured to: obtain, according to a current distance between the dynamic reference point and the location indicated by the destination information, and speed information included in the obtained real-time information, information about a predicted time that needs to be spent in reaching the destination; and screen the to-be-screened information according to the time information, to obtain, in the to-be-screened information, surrounding-life-service information matching the time information, and determine the surrounding-life-service information as the push information.

In an implementation manner of this embodiment of the present invention, the processing unit is further configured to: obtain a function attribute identifier corresponding to the destination information; and screen the to-be-screened information according to the function attribute identifier, to obtain, in the to-be-screened information, surrounding-lifeservice information matching the function attribute identifier, and determine the surrounding-life-service information as the push information.

In an implementation manner of this embodiment of the present invention, the processing unit is further configured to: obtain information about surroundings around the location indicated by the destination information; and when the user behavior information indicates that the user is in a travel-by-driving mode, screen the to-be-screened information according to reference information including the travel-by-driving mode, the destination information, and the surrounding information, to obtain, in the to-be-screened information, surrounding-life-service information matching the reference information, and determine the surrounding-life-service information as the push information.

In an implementation manner of this embodiment of the present invention, the processing unit is further configured to: obtain historically collected information and/or POI information of the user; and screen the to-be-screened information according to the historically collected information and/or the POI information of the user, to obtain, in the to-be-screened information, surrounding-life-service information matching the historically collected information and/or the POI information of the user, and determine the surrounding-life-service information as the push information.

In an implementation manner of this embodiment of the present invention, the processing unit is further configured to: screen the to-be-screened information according to the historically collected information and/or the POI information of the user, to obtain, in the to-be-screened information, surrounding-life-service information that does not match the historically collected information and/or the POI information of the user, mark the surrounding-life-service information as information not to be pushed, and delete the information that is marked as information not to be pushed from the to-be-screened information.

In an implementation manner of this embodiment of the present invention, the processing unit is further configured to: screen the to-be-screened information according to the historically collected information and/or the POI information of the user, to obtain, in the to-be-screened information, surrounding-life-service information that matches the historically collected information and/or the POI information of the user and that is frequently used, mark the surrounding-life-service information as information having a low pushing priority, and postpone pushing of the information that is marked as information having a low pushing priority, or directly delete the information that is marked as information having a low pushing priority from the to-be-screened information.

It should be noted herein that, the client may be an electronic device such as a PC, or may be a portable electronic device such as a PAD, a tablet computer, or a portable computer, or may be a smart mobile terminal such as a mobile phone, which is not limited to the description herein. The server may be an electronic device that is formed by a cluster system and that integrates the functions of the units or separately implements the functions of the units. Both the client and the server include at least a database for data storage and a processor for data processing, or include a storage medium that is disposed in the server or a storage medium that is disposed independently.

When performing processing, the processor for data processing may be implemented by using a microprocessor, a CPU, a DSP, or an FPGA. The storage medium includes operation instructions, where the operation instructions may be computer executable code, and are used to implement the steps in the information processing methods in the foregoing embodiments of the present invention.

Figure 6:
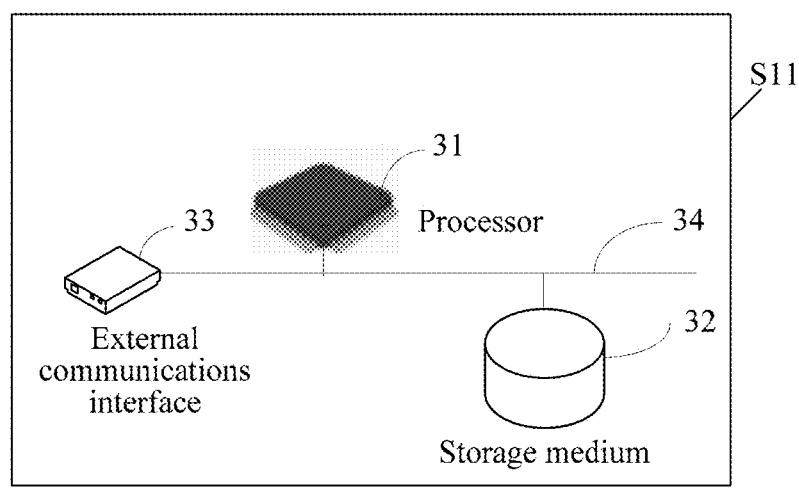
FIG. 6 is a schematic structural diagram of hardware of a terminal or a server according to an embodiment of the present invention.

An example in which the client and the server are implemented as hardware entities S11 is shown in FIG. 6. The apparatus includes a processor 31, a storage medium 32, and at least one external communications interface 33. The processor 31, the storage medium 32, and the external communications interface 33 are all connected by using a bus 34.

It should be noted herein that, the foregoing descriptions related to the client and the server are similar to the foregoing descriptions of the methods, and beneficial effects are similar to those of the methods, and details are not described herein again. For technical details that are not disclosed in the client and server embodiments of the present invention, refer to the descriptions in the method embodiments of the present invention.

The embodiments of the present invention are elucidated below by using an actual application scenario as an example.

The scenario is a scenario of navigation by using a map application. The embodiments of the present invention are used in this scenario, and a comprehensive solution for increasing active users by virtue of positioning and message pushing is provided. A location service and an information pushing mechanism are mainly involved in this scenario.

Specifically, an LBS function is used. The LBS function is a value added service that is used to provide a user with a corresponding service in the support of a geographic information system (GIS) platform by obtaining location information (geographic coordinates or geodetic coordinates) of a user of a mobile terminal by using a radio communications network (for example, a GSM network or a CDMA network) of a mobile telecommunications operator or in an external positioning manner (for example, GPS).

Specifically, the information pushing mechanism may be "web broadcast", which is a new technology for reducing information overload by regularly transmitting information needed by a user on the Internet according to a certain technical standard or protocol. By using the pushing technology, a time for searching a network is reduced by automatically transmitting information to a user. The pushing technology helps a user to efficiently obtain valuable information by searching for and filtering information according to interests of the user and regularly pushing the information to the user.

This scenario also involves an information collection mechanism, which means that a user collects various different types of places or route schemes according to personal preferences and habits in a process of using a map application.

This scenario also involves a mechanism for performing analysis by using a POI, where a POI may be a house, a store, a mailbox, a bus station, or the like in a geographical information system. A corresponding detail page generally includes basic information such as an address and a telephone number, and may further include some additional information such as photographs or customer comments.

In the scenario of navigation by using a map application, the prior art implements a single navigation function. That is, route search provides a user with only a simple route scheme, and after reaching a destination according to the route scheme, the user substantially no longer needs the map application, and is not motivated to continue to use the map application in a short time. In addition, information service needs of the user after arriving at the destination are ignored, but such needs are often information more desirably needed by the user for guiding the user on a next operation. However, in this scenario, when the embodiments of the present invention are used, by means of a background positioning feature of map software, in a process of using a route service (or within a short time window after the route service is used) by a user, prediction and determining are performed based on travel behaviors of the user, comprehensive screening is performed to obtain push information for pushing in a message pushing manner, and finally valuable surrounding life information obtained through a series of comprehensive determining and screening is provided to the user by using an information pushing service. After the user arrives at a destination, the user is motivated to continue to use the map application. In this way, not only application activeness and application thoughtfulness are improved, but also a channel connecting online and offline is established.

Specifically, the embodiments of the present invention are mainly used in this scenario as follows:

The QQ Map application is used as an example for description. Step 1: First, after a user installs the map application, it is generally assumed that the user allows QQ Map to use a location service and an LBS service switch in a system is switched on. Step 2: After the user enters a start point and an end point of a route and obtains a resulted scheme, the QQ Map application starts to monitor a real-time location of the user by using an existing positioning service. When the real-time location of the user approaches a range of 1 to 3 kilometers from the end point of the searched route, an information pushing mechanism is triggered, and an information screening process is started. Certainly, another mechanism for triggering information pushing may be set, and the mechanism is not limited to the distance range herein, and may be an arrival time range. For example, the information pushing mechanism may be triggered when it needs 30 minutes to reach the destination. Step 3: Start the information screening process. Step 4: By combining pushing habits of the user and the consideration factors in the foregoing steps, information that is most likely to be useful to the user can be substantially screened out for directional delivery by using a server. However, it also needs to be considered that users have different acceptance levels for such information pushing, and some factors concerning private information of the user need to be evaded. Therefore, in addition to clearly stating possible risks, a control switch for the information pushing function needs to be added, so that the user may make adjustments by using the control switch, to determine whether such an information pushing mechanism is accepted, or determine an acceptance level, or determine which information is allowed to be received, so as to satisfy different user habits.

For Step 3, the information screening process mainly includes the following several aspects:

1. Information Source

Valuable life service information is obtained through technical means to ensure effectiveness, accuracy, professionalism of the information. All life service information in a range having a certain radiation radius and centering on a user positioning point (the positioning point is a real-time location of the user between the start point and the endpoint on QQ Map, or may be the destination of the user) is used as a library of to-be-screened information, and the life service information exists in a form of information elements in a POI detail page or an access entry.

2. Instant Time in the Scenario

The instant time herein is time at which the user actually arrives at the destination. A case in which pushed information content is inconsistent with current time of the user needs to be avoided to prevent interference from useless information.

The actual arrival time of the user is analyzed and predicted. For example, the user arrives at an office mansion at about 12 a.m., catering service information around the office mansion is mainly considered to be pushed instead of hotel accommodation information around the office mansion.

3. Function of the Destination

A function of the destination needs to be analyzed to some extent in the information screening process. For example, the destination is set to "Shin Kong Place", product discount information may be considered to be used as push information for the user, and the user can obtain and view the special offer information in a corresponding POI detail page in the map application.

For example, if the destination is set to "Haidian District Internal Revenue Service", information such as contact information, an address, office hours, and internal office distribution of the organization may be considered to be used as push information. For such information, the above mentioned scenario instant time factor may be omitted.

4. Travel Mode and Surroundings Around the Destination

A travel mode and surroundings around the destination are fully considered in the information screening process. For example, when searching for a driving route, the user sets a destination to a well-known hospital around which parking spaces are quite inadequate. In this case, when information is pushed, information about nearby parking lots and real-time parking space information may be selected to meet main potential needs of the user.

5. User Preferences

User preferences relate to analysis of routine behaviors and collected information of the user.

On one hand, a range of daily activities of the user is analyzed according to a routine. For daily life and work places that the user is already familiar with, pushing of nearby frequently-used life information should be avoided. On the other hand, habits and preferences of the user are analyzed according to collected places or routes of the user. For example, if collected places of the user are mostly Sichuan cuisine restaurants, and average consumption per person ranges from 50 to 100 Yuan, when the user arrives at an unfamiliar place around meal time, the factor of the preferences of the user should be fully considered when catering service information is pushed.

Figure 7:
FIG. 7 to FIG. 11 are schematic diagrams of application scenarios in which embodiments of the present invention are applied.
Figure 8:
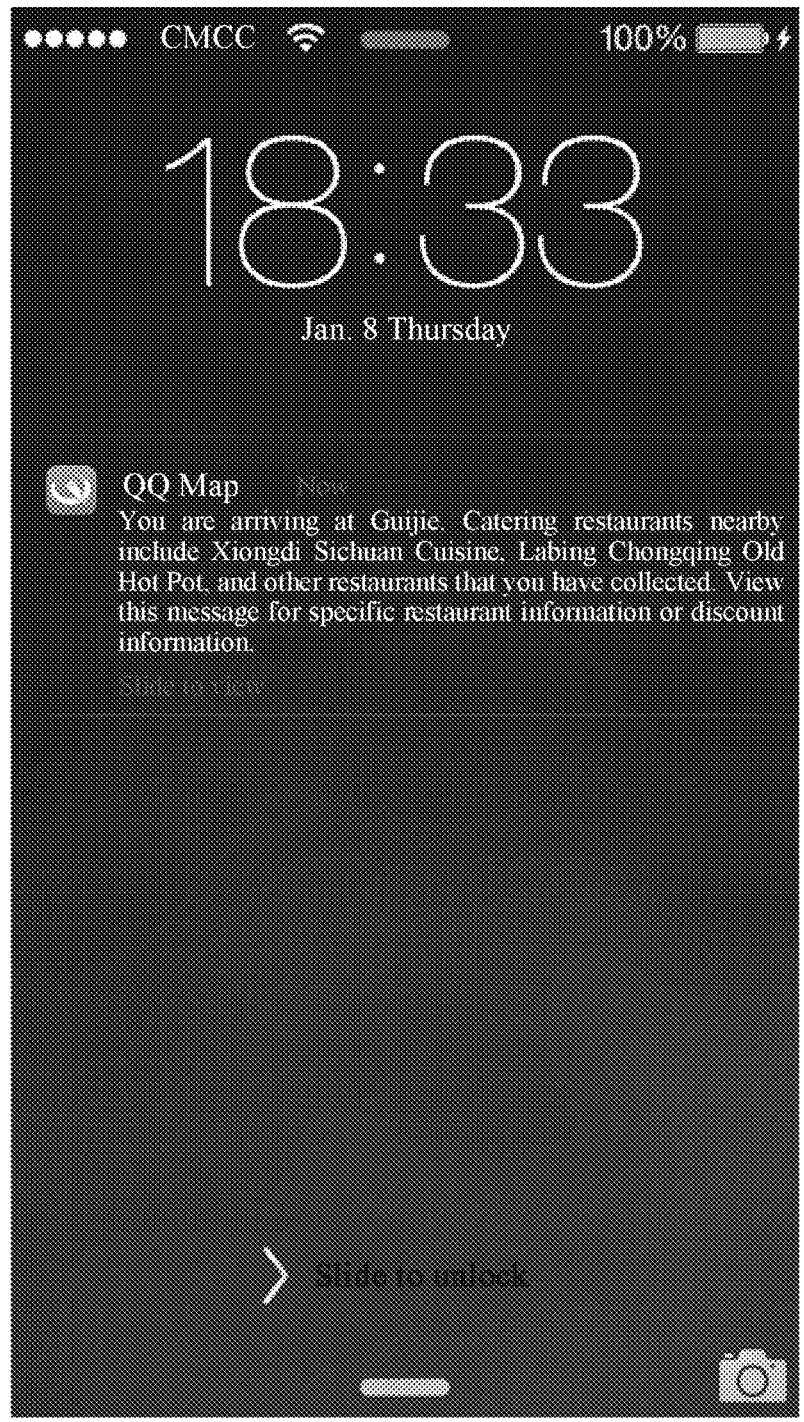
Figure 9:
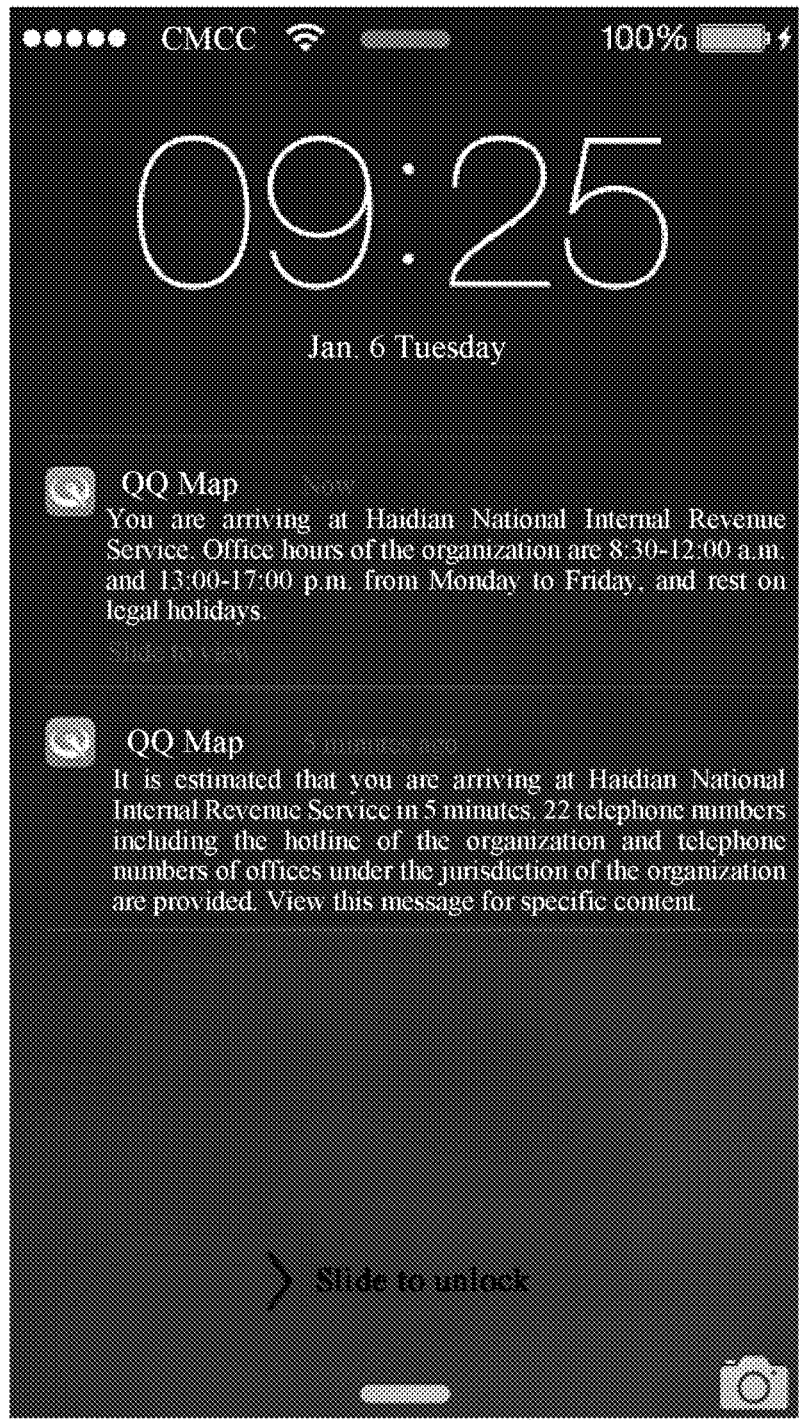
Figure 10:
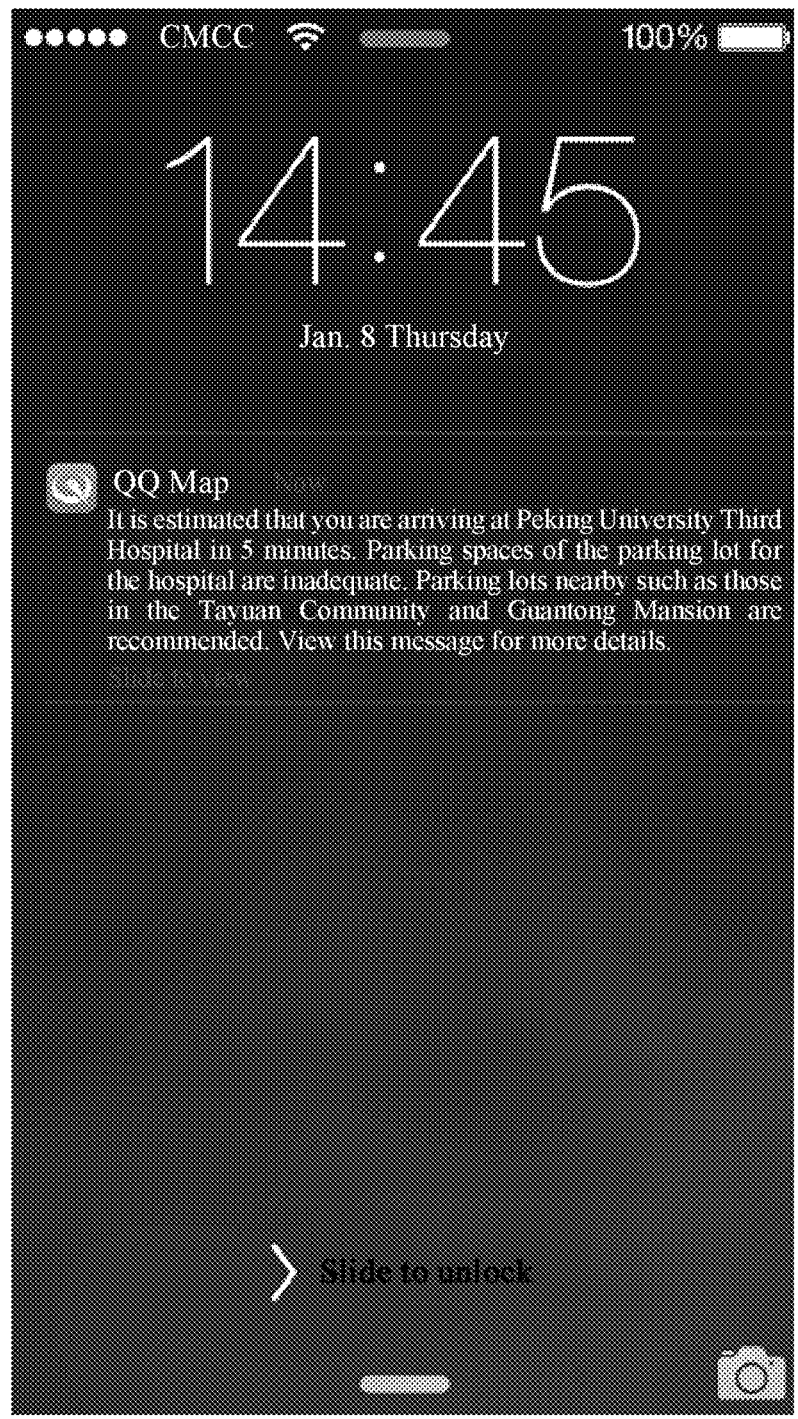
Figure 11:
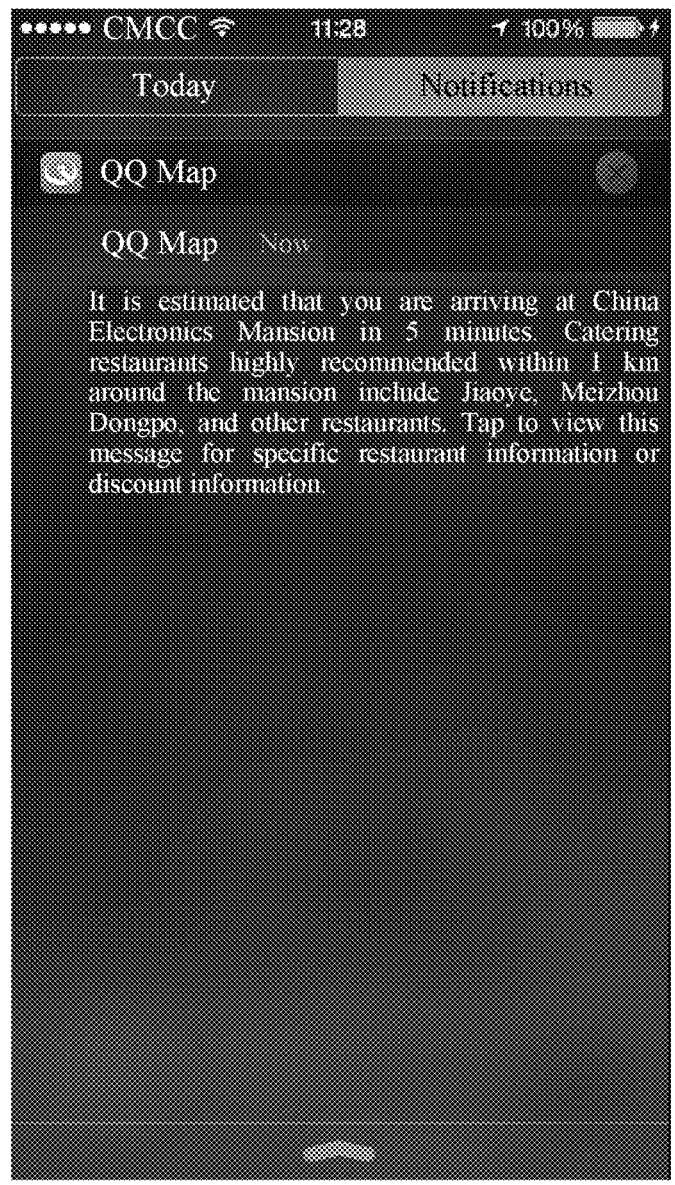

Several schematic diagrams when the embodiments of the present invention are used in this scenario are shown in FIG. 7 to FIG. 11. FIG. 7 is a schematic diagram of discount information of a reached destination (a store) in a display interface in the QQ Map application on the terminal, where the destination is CapitaLand MALL (Wangjing), and pushed stores include ZARA, Uniqlo, and the like. The user may interact with the application by tapping to open the push information, to view more details of the stores and discount information. FIG. 8 is a schematic diagram of information pushing according to personal preference information and like information of the user in the display interface in the QQ Map application on the terminal, where the destination is Guijie, and pushed restaurants include Xiongdi Sichuan Cuisine, Labing Chongqing Old Hot Pot, and other restaurants that have been collected by the user. The user may interact with the application by tapping to open the push information, to view more details of the catering restaurants and discount information. FIG. 9 is a schematic diagram of information such as contact information and office hours of Haidian National Internal Revenue Service in the display interface in the QQ Map application on the terminal, where the destination is Haidian National Internal Revenue Service, and push information includes office hours, legal holidays, and other information of the organization. The user may interact with the application by tapping to open the push information, to view more details of contact information of the tax system. FIG. 10 is a schematic diagram showing that parking spaces of a parking lot around the destination are inadequate in the display interface in the QQ Map application on the terminal, where the destination is Peking University Third Hospital, and push information includes a prompt that parking spaces around the hospital are inadequate, and recommending the user to park in another nearby place where parking spaces are adequate. The user may interact with the application by tapping to open the push information, to view more details of parking recommendation information. FIG. 11 is a schematic diagram of pushing catering information around a destination in a found route around lunch time in the display interface in the QQ Map application on the terminal, where the destination is China Electronics Mansion, and push information includes catering restaurants around the mansion, such as Jiaoye and Meizhou Dongpo. The user may interact with the application by tapping to open the push information, to view more details of the catering restaurants.

When implemented in the form of a software functional module and sold or used as an independent product, the integrated module in the embodiments of the present invention may be stored in a computer readable storage medium. Based on such an understanding, a person skilled in the art should understand that, the embodiments of the present application may be provided as a method, a system, or a computer program product. Therefore, the present application may use a form of a hardware only embodiment, a software only embodiment, or an embodiment with a combination of software and hardware. Moreover, the present application may use the form of a computer program product that is implemented on one or more computer usable storage media including computer usable program code. The storage media include, but are not limited to, a USB flash disk, a mobile hard disk drive, a read-only memory (ROM), a magnetic disk memory, a CD-ROM, an optical memory, and the like.

The present application is described according to flowcharts and/or block diagrams of the methods, devices (systems), and computer program products in the embodiments of the present application. It should be noted that, each process and/or block in the flowcharts and/or block diagrams and a combination of a process and/or block in the flowcharts and/or block diagrams may be implemented by using a computer program instruction. These computer program instructions may be provided to a processor in a general-purpose computer, a special-purpose computer, an embedded processor, or another programmable data processing device to generate a machine, so that when the instructions are executed by the processor in the computer or the another programmable data processing device, an apparatus for implementing specified functions in one or more processes in the flowcharts or one or more blocks in the block diagrams is generated.

These computer program instructions may be stored in a computer readable memory that can instruct the computer or the another programmable data processing device to operate in a particular manner, so that when the instructions stored in the computer readable memory are executed, a product including an instruction apparatus is generated, where the instruction apparatus implements specified functions in one or more processes in the flowcharts or one or more blocks in the block diagrams.

These computer program instructions may be loaded into the computer or the another programmable data processing device, so that a series of operation steps are performed in the computer or the another programmable device to generate processing to be implemented by a computer, so that when the instructions are executed in the computer or the another programmable device, steps for implementing specified functions in one or more processes in the flowcharts or one or more blocks in the block diagrams are provided.

Although preferred embodiments of the present application have been described, once learning the basic inventive concepts, a person skilled in the art may make changes and modifications to these embodiments. Therefore, the accompanying claims are intended to be construed as covering the preferred embodiments and all changes and modifications falling within the scope of the present application.

Correspondingly, an embodiment of the present invention further provides a computer storage medium, storing computer executable instructions, where the computer executable instructions are used to implement the information processing methods in the foregoing embodiments of the present invention.

INDUSTRIAL APPLICABILITY

By using the embodiments of the present invention, in addition to positioning a location of a user and navigation, push information obtained through comprehensive determining based on at least one combination of location information, time information, user behavior information, historically collected information, and POI information can be obtained based on real-time information of the user when the user moves along a route indicated by route indication information. In this way, information sharing and information pushing functions are implemented.

What is claimed is:

1. An information processing method performed at a terminal having one or more processors, memory storing a plurality of programs to be executed by the one or more processors and a display, the method comprising:
   starting a location service of a first application on the terminal;
   obtaining place-of-departure information and destination information in the display based on an operation of a user;
   generating route indication information according to the place-of-departure information and the destination information;
   detecting, based on the location service of the first application, real-time information of the user when the user moves along a route indicated by the route indication information the real time information including a current location of the terminal and a current speed of the terminal;
   reporting the real-time information to a server;
   reporting a preset condition to the server in accordance with a determination that the preset condition is satisfied, the preset condition including that the terminal is within a predetermined distance from the destination information, to obtain push information that is obtained through comprehensive determining based on the real-time information and one or more services supplemental to a primary service provided by a destination indicated by the destination information;

receiving the push information that is directionally pushed by the server according to reported preset condition; and displaying, in the first application, the push information and/or location information combined with the push information.

2. The method according to claim 1, further comprising:

detecting the preset condition that is set in the first application, wherein the detected preset condition is reported to the server.

3. The method according to claim 1, further comprising:

detecting the preset condition that is set in the first application, wherein the detected preset condition is reported to the server, and the push information is received after the route indication information is used.

4. A mobile terminal having one or more processors, memory, a plurality of programs stored in the memory and to be executed by the one or more processors, and a display, the plurality of programs further comprising:

a running unit, configured to: start a location service of a first application, and run the first application on the terminal;

a user-operation response unit, configured to: obtain place-of-departure information and destination information in the display based on an operation of a user, and generate route indication information according to the place-of-departure information and the destination information;

a reporting unit, configured to: detect, based on the location service of the first application, real-time information of the user when the user moves along a route indicated by the route indication information, the real time information including a current location of the terminal and a current speed of the terminal, report the real-time information to a server, and report a preset condition to the server in accordance with a determination that the preset condition is satisfied, the preset condition including that the terminal is within a predetermined distance from the destination information, to obtain push information that is obtained through comprehensive determining based on the real-time information and one or more services supplemental to a primary service provided by a destination indicated by the destination information; and a receiving and display unit, configured to: receive the push information that is directionally pushed by the server according to reported preset condition, and display, in the first application, the push information and/or location information combined with the push information.

5. The terminal according to claim 4, wherein the reporting unit is further configured to: detect the preset condition that is set in the first application, and report the detected preset condition to the server.

6. The terminal according to claim 4, wherein the reporting unit is further configured to: detect the preset condition that is set in the first application, and report the detected preset condition to the server; and the receiving and display unit is further configured to: receive, after the route indication information is used, the push information.

7. A non-transitory computer storage medium storing a plurality of computer executable instructions, the computer executable instructions being used by a terminal having one or more processors and a display, wherein the computer executable instructions cause the terminal to:

start a location service of a first application on the terminal;

obtain place-of-departure information and destination information in the display based on an operation of a user;

generate route indication information according to the place-of-departure information and the destination information;

detect, based on the location service of the first application, real-time information of the user when the user moves along a route indicated by the route indication information, the real time information including a current location of the terminal and a current speed of the terminal;

report the real-time information to a server;

report a preset condition to the server in accordance with a determination that the preset condition is satisfied, the preset condition including that the terminal is within a predetermined distance from the destination information, to obtain push information that is obtained through comprehensive determining based on the real-time information and one or more services supplemental to a primary service provided by a destination indicated by the destination information;

receive the push information that is directionally pushed by the server according to reported preset condition; and display, in the first application, the push information and/or location information combined with the push information.

8. The non-transitory computer storage medium according to claim 7, wherein the computer executable instructions further cause the terminal to:

detect the preset condition that is set in the first application, wherein the detected preset condition is reported to the server.

9. The non-transitory computer storage medium according to claim 7, wherein the computer executable instructions further cause the terminal to:

detect the preset condition that is set in the first application, and report the preset condition to the server, wherein the push information is received after the route indication information is used.

* * * * *